(12) United States Patent
Matsuzawa

(10) Patent No.: US 6,621,551 B2
(45) Date of Patent: Sep. 16, 2003

(54) METHOD AND SYSTEM FOR FABRICATING A LIQUID CRYSTAL DISPLAY BY OPTICALLY DETECTING ANISOTROPIC ANGULAR MISALIGNMENT

(75) Inventor: Tadashi Matsuzawa, Tokyo (JP)

(73) Assignee: NEC LCD Technologies, Ltd. (JP)

( * ) Notice: Subject to any disclaimer, the term of this patent is extended or adjusted under 35 U.S.C. 154(b) by 147 days.

(21) Appl. No.: 09/892,836

(22) Filed: Jun. 27, 2001

(65) Prior Publication Data

US 2002/0001060 A1 Jan. 3, 2002

(30) Foreign Application Priority Data

Jun. 30, 2000 (JP) .......................... 2000-199562

(51) Int. Cl.⁷ ................................ G02F 1/13
(52) U.S. Cl. .................. 349/187; 349/123; 349/124; 349/117
(58) Field of Search ................. 349/187, 123, 349/124, 117, 121

(56) References Cited

U.S. PATENT DOCUMENTS

| 4,239,349 | A | * | 12/1980 | Scheffer | ............... | 349/117 |
| 5,311,284 | A | * | 5/1994 | Nishino | ............... | 356/364 |
| 5,734,472 | A | * | 3/1998 | Ito et al. | ............... | 356/364 |

* cited by examiner

Primary Examiner—Tarifur R. Chowdhury
(74) Attorney, Agent, or Firm—Hayes Soloway P.C.

(57) ABSTRACT

A liquid crystal display panel is placed on a fixed base and an anisotropic film is set in a position relative to the orientation layer of the display panel. Linearly polarized light is directed to the panel and the anisotropic film and light passing through them are detected. According to the intensity of the detected light, the angle of orientation of the anisotropic film is adjusted relative to the orientation layer. Angular misalignment, which may exist between the anisotropic film and the orientation layer, is minimized.

22 Claims, 14 Drawing Sheets

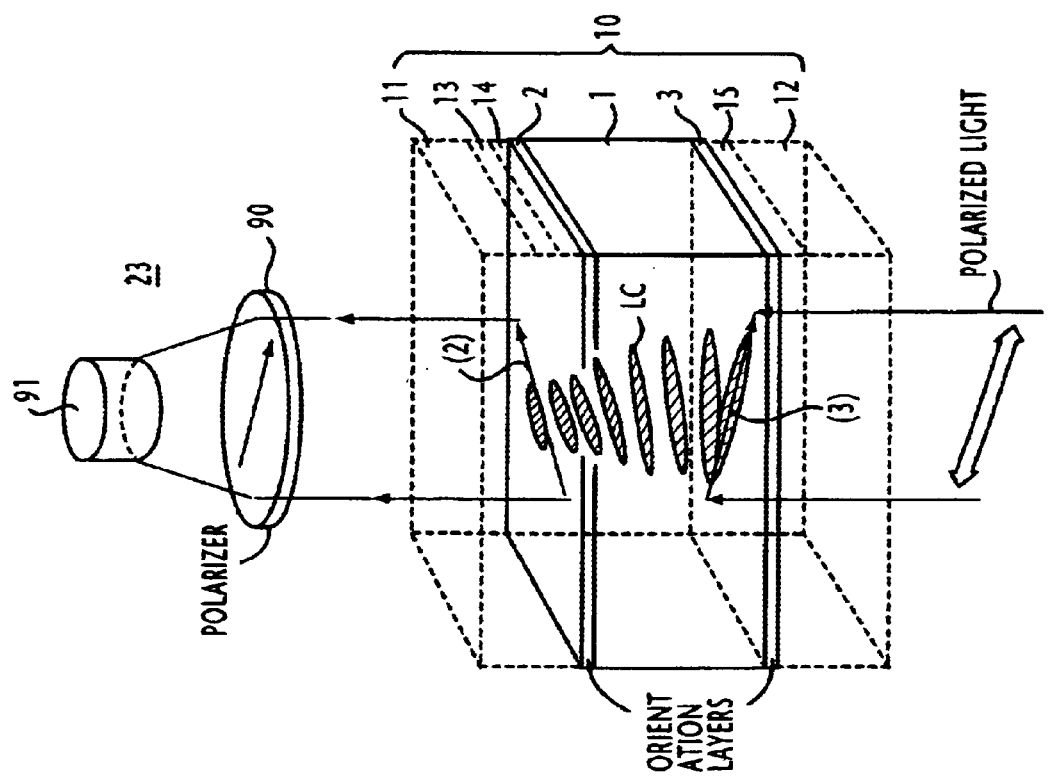

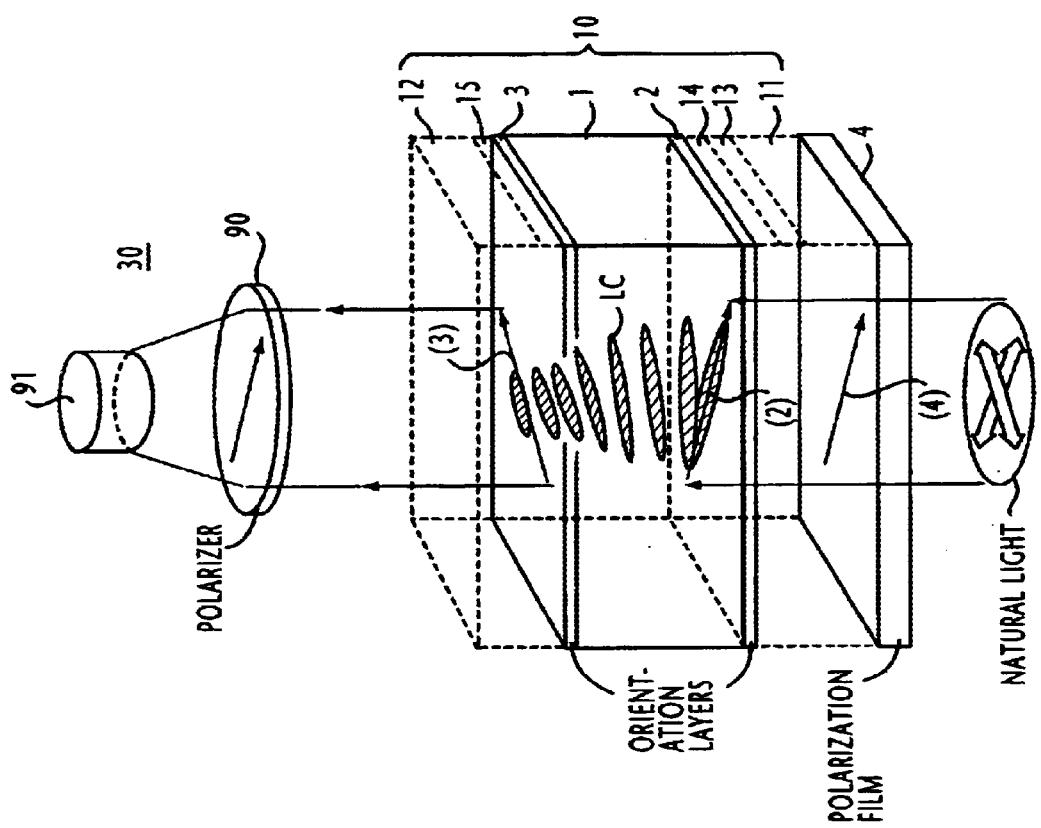

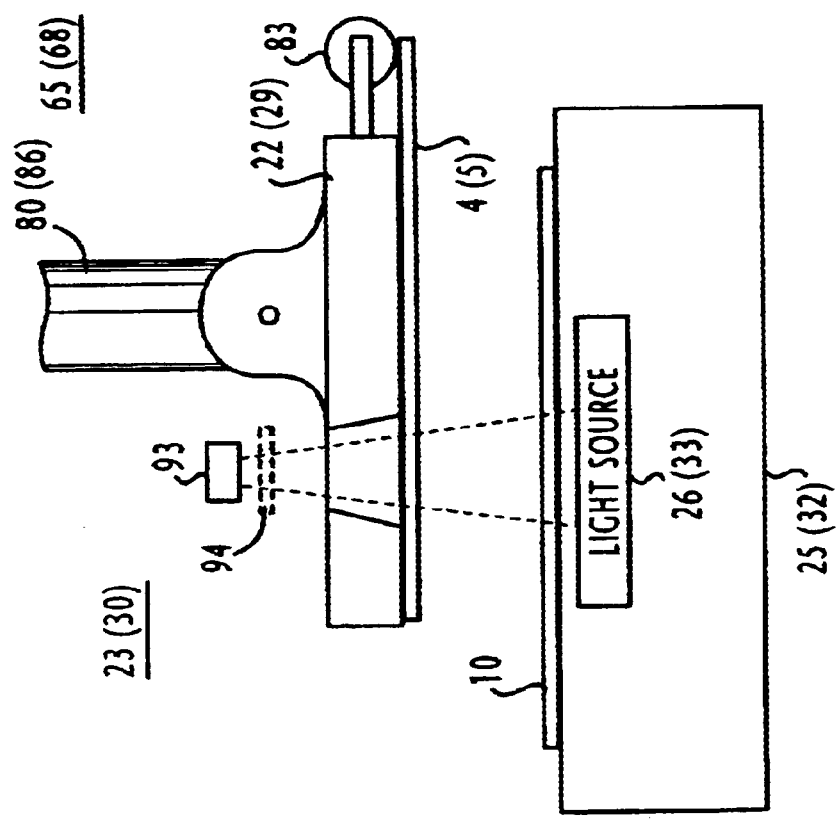

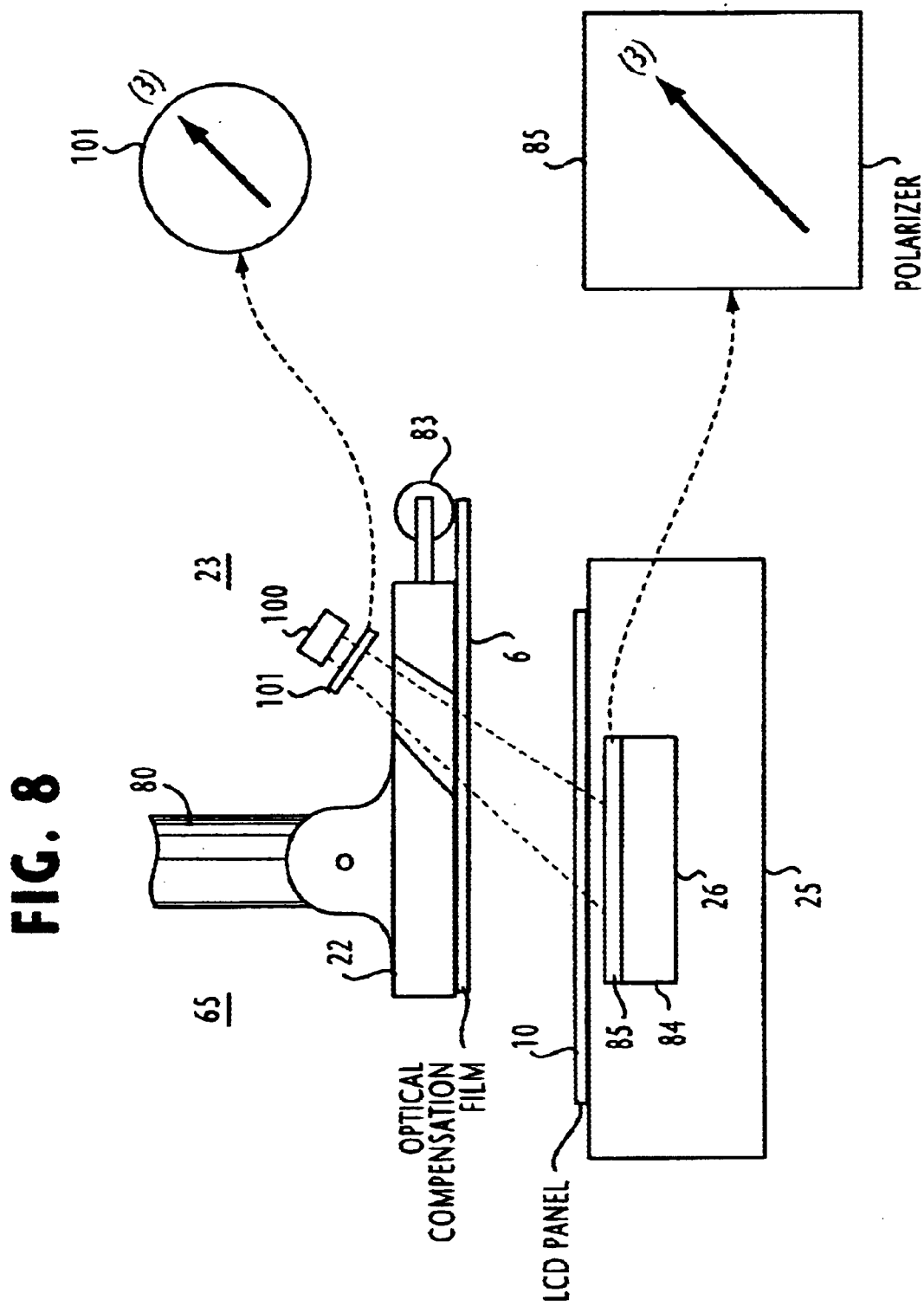

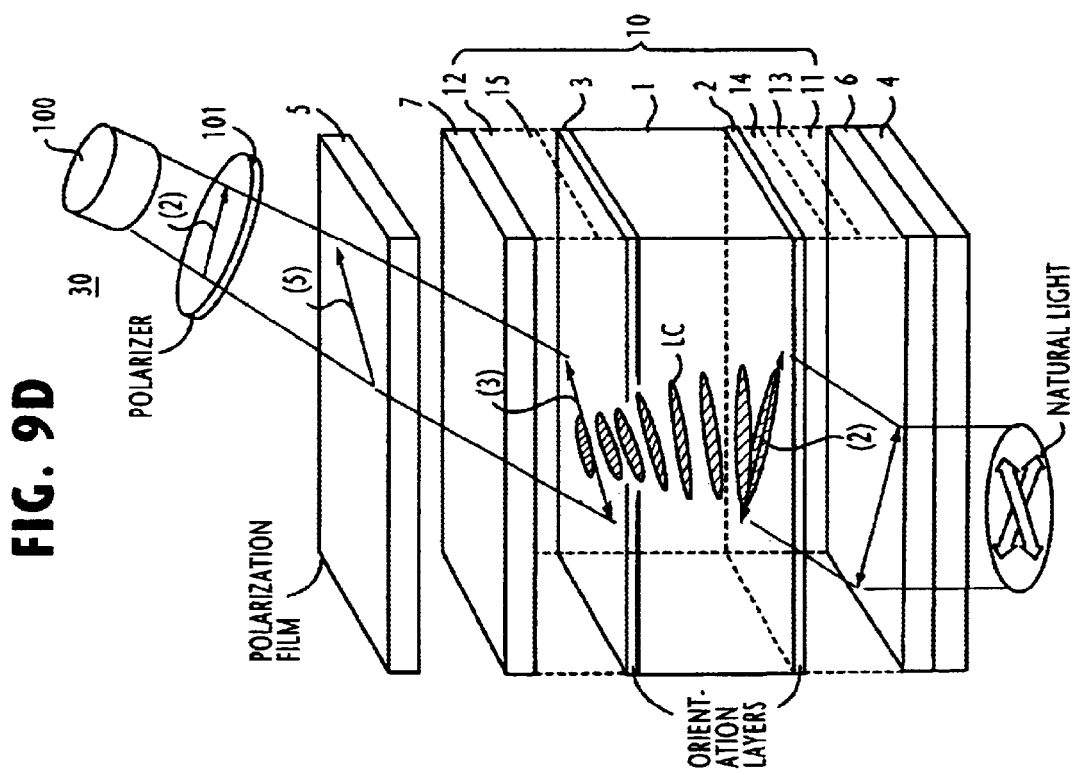

METHOD AND SYSTEM FOR FABRICATING A LIQUID CRYSTAL DISPLAY BY OPTICALLY DETECTING ANISOTROPIC ANGULAR MISALIGNMENT

BACKGROUND OF THE INVENTION

1. Field of the Invention

The present invention relates generally to liquid crystal display and more specifically to a method and a system for fabricating LCD panels by with a reduced angular misalignment between the anisotropic axes of laminated layers.

2. Description of the Related Art

Liquid crystal displays, such as twisted nematic type, usually comprise a liquid crystal layer and a pair of orientation (alignment) layers, one on each side of the liquid crystal layer, to cause their molecules to twist along its thickness and orient in mutually orthogonal directions on its opposite surface when no voltage is applied. On the outer side of each orientation layer is a polarization film so arranged that its polarization (anisotropic) is aligned with that of the orientation layer. When one of the polarization films is illuminated with natural light, only that portion of the incident light linearly aligned with the polarizaton axis of the film is allowed to enter the liquid crystal layer. Under zero electrical field, the linearly polarized light is subjected to a full 90-degree twist as it traverses the liquid crystal layer and allowed to pass through other polarization film, producing a maximum level of brightness (white luminance representation). When a full voltage is applied across the liquid crystal layer, the molecules are transposed in the direction of thickness, causing the polarized light aligned with one polarization film to be twisted out of alignment with the other polarization film, producing a maximum level of darkness (black luminance representation). In the IPS (in plane switching) type of liquid crystal displays, the axes of the orientation layers are equally aligned so that ON/OFF switching modes are in reverse to those of the twisted nematic types.

One of the important characteristics used to evaluate the quality of an LCD panel is the black-to-white contrast ratio, i.e., the ratio of the white luminance to the black luminance. Angular misalignment between the polarization film and the orientation layer, which may occur when they are pasted together, represents a potential cause of low contrast ratios. Experiments indicate that the angular misalignment of as small as 4 degrees causes the contrast ratio of LCD panels to decrease from the maximum value of 400 to as low as 150.

Mechanical methods are currently employed to align polarization films with the orientation layers of liquid crystal panels. However, due to manufacturing tolerances, precision alignment cannot consistently be obtained. As a result, variability exists in contrast ratio, which ranges significantly between 400 and 200 for misalignments of plus/minus 2 to 3 degrees.

To overcome this problem, Japanese Patent Publication 11-271778 discloses a method in which a polarization film is initially pasted on one surface of a liquid crystal layer where a light sensitive layer is applied and ultraviolet light of 350 nanometers is then used to illuminate the liquid crystal layer through the polarization film. The molecules in the illuminated light sensitive layer are excited and their axis is oriented in the same direction as the polarization film. However, suitable materials for use with such orientation layers are not available at present.

In addition, optical compensation films are currently used in LCD panels. The films of this type is a birefringence characteristic that compensates for the loss of light transmissivity of the panel when viewed at a skewed angle. Since this optical compensation film has an anisotropic axis, it must be aligned with the axis of a polarization film when they are pasted together.

SUMMARY OF THE INVENTION

It is therefore an object of the present invention to provide a method and system for fabricating a liquid crystal display that eliminates angular misalignment between optically anisotropic films and orientation layers.

According to a first aspect, the present invention provides a method of fabricating a liquid crystal display, comprising the steps of setting a liquid crystal display panel on a fixed base, the panel including a liquid crystal layer and an orientation layer on one surface of the liquid crystal layer, setting an anisotropic film relative to the orientation layer, directing linearly polarized light to the panel and the anisotropic film and detecting light therefrom, and adjusting angle of orientation of the anisotropic film relative to the orientation layer according to intensity of the detected light.

According to a second aspect, the present invention provides a method of fabricating a liquid crystal display, comprising the steps of setting a liquid crystal display panel on a fixed base, the panel including a liquid crystal layer and an orientation layer on one surface of the liquid crystal layer, setting an optical compensation film and a polarizer relative to the orientation layer, directing linearly polarized light to the panel, the optical compensation film and the polarizer at a skewed angle and detecting light therefrom, the linearly polarized light having a polarization axis aligned with polarization axis of the polarizer, and adjusting angle of orientation of the optical compensation film relative to the orientation layer according to intensity of the detected light.

According to a third aspect, the present invention provides a system for fabricating a liquid crystal display, comprising base means for setting a liquid crystal display panel, the panel including a liquid crystal layer and an orientation layer on one surface of the liquid crystal layer, carrier means for setting an anisotropic film relative to the orientation layer, a light source for directing linearly polarized light to the panel and the anisotropic film, and an optical sensor for detecting the directed light from the anisotropic film. The carrier means is rotatable so that angle of orientation of the anisotropic film can be adjusted relative to the orientation layer according to intensity of the detected light.

According to a fourth aspect, the present invention provides a system for fabricating a liquid crystal display, comprising base means for setting a liquid crystal display panel, the panel including a liquid crystal layer and an orientation layer on one surface of the liquid crystal layer, carrier means for setting an optical compensation film and a polarizer relative to the orientation layer, a light source for directing linearly polarized light to the panel, the optical compensation film and the polarizer at a skewed angle, and an optical sensor for detecting the directed light from the polarizer. The linearly polarized light has a polarization axis aligned with polarization axis of the polarizer. The carrier means is rotatable so that angle of orientation of the optical compensation film can be adjusted relative to the orientation layer according to intensity of the detected light.

BRIEF DESCRIPTION OF THE DRAWINGS

The present invention will be described in detail further with reference to the following drawings, in which:

FIG. 3A is an enlarged perspective view of a portion of an LCD panel and the polarizer of the first embodiment through which polarized light is directed for detecting misalignment between a first polarization film and the first orientation layer of the LCD panel;

FIG. 3B is an enlarged perspective view of a portion of an LCD panel and the polarizer of the first embodiment through which polarized light is directed for detecting misalignment between a second polarization film and the second orientation layer of the LCD panel;

FIG. 5 is a side view of a suction plate on which an optical system of a second embodiment is mounted for sensing polarized light directed through an LCD panel and a polarization film;

FIG. 8 is a side view of a suction plate on which an optical system of a fourth embodiment of the present invention is mounted for sensing polarized light directed at a skewed angle through an LCD panel and an optical compensation film;

FIG. 9D is an enlarged perspective view of a portion of the LCD panel and a second polarization film of the fourth embodiment.

DETAILED DESCRIPTION

Figure 1:
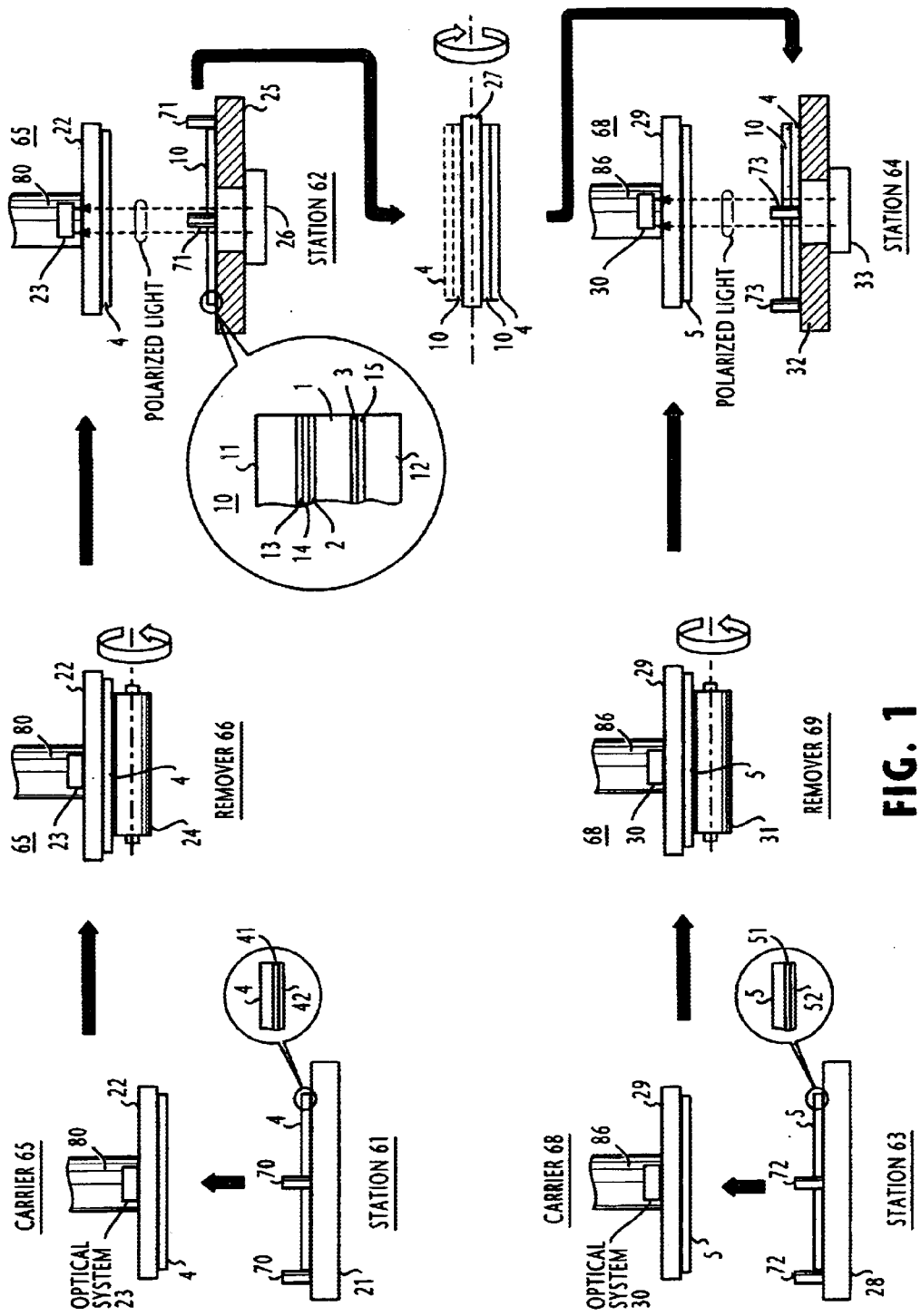
FIG. 1 is a schematic diagram of a manufacturing system of the present invention for fabricating liquid crystal displays.

In FIG. 1, there is shown a system for pasting a polarization film on each surface of an LCD (liquid crystal display) panel according to the present invention. The system is comprised of first, second, third and fourth work stations 61 to 64.

At the first work station 61, a holder (suction) base 21 is provided for setting a polarization film 4 in a predetermined fixed position using three vertically movable edge guides 70 and holding it in position with a flow of sucking air that is drawn to the outside through a plurality of holes provided on the surface of the base 21. Guides 70 are lowered below the surface of the base 21 when the film 4 is properly held in position. Polarization film 4 is coated with a layer of transparent adhesive 41 covered with a separable sheet 42. When the polarization film 4 is held on the surface of the base 21, the separable sheet 42 is facing downwards.

Further, at the first work station, a film carrier 65 is provided above the suction base 21. Carrier 65 includes a suction plate 22 which is supported by a movable arm 80 connected to a drive system, not shown, so that the plate 22 is vertically movable between high and low positions and horizontally slidable between the first and second stations 61 and 62.

When the carrier 65 is in the lower position, the suction air that is holding the film 4 on the base 21 is stopped and the suction plate 22 starts sucking air upwards so that the film 4 is removed from the base 21 and attached to the bottom of the plate 22. Carrier 65 is then raised to the higher position and is started moving towards the second work station 62. Before reaching the second station, the carrier 65 encounters a sheet remover 66 where the separable sheet 42 of the polarization film is brought into contact with a roll 24 of adhesive tape which is rotating about its horizontal axis. While rotating about its axis, the roll 24 slides from one edge of the polarization film 4 to the other in a direction normal to the direction of its rotation. As a result, an adhesive layer is applied to the lower side of separable sheet 42. At the end of the travel, the roll 24 stops and then moves backwards while rotating about its axis so that the separable sheet 42 is peeled off the polarization film 4, exposing the sticking layer 41 to the outside.

Then, the carrier 65 moves to the second work station 62. At the second work station, an LCD panel 10 is set on a suction base 25 using three vertically movable edge guides 71 and held under negative pressured caused by air downwardly sucked through a plurality of holes provided on the surface of the base 25. Guides 71 are lowered below the surface of the base 25 when the LCD panel 10 is held in position.

As illustrated, the LCD panel 10 is comprised of a pair of glass substrates 11 and 12, a color filter 13 below the substrate 11, a common electrode 14 and a pixel electrode 15. A liquid crystal layer 1, which is sandwiched between orientation (or alignment) layers 2 and 3, is disposed between the electrodes 14 and 15. Each of these orientation layers has a polarization axis orthogonal to the polarization axis of the other.

In order to provide precision alignment of polarization axes between the polarization film 4 and the orientation layer 2 which is positioned on the upper side of the liquid crystal layer 1, polarized light is directed from a polarized light source 26 mounted on the suction base 25 through the LCD panel 10 to an optical system 23 on the suction plate 22.

Figure 2:
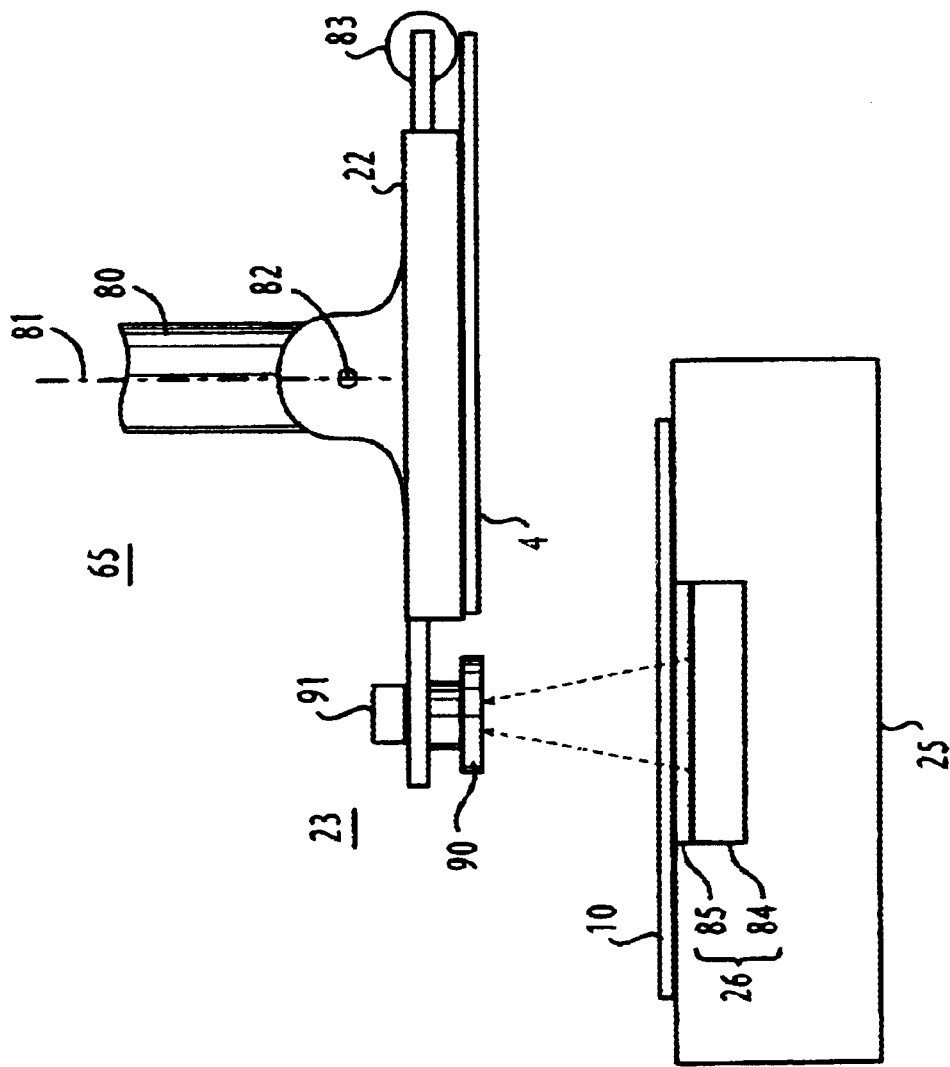
FIG. 2 is a side view of an optical system of a first embodiment of the present invention shown mounted on a suction plate with respect to a suction base on which an LCD panel is secured in place.
Figure 4:
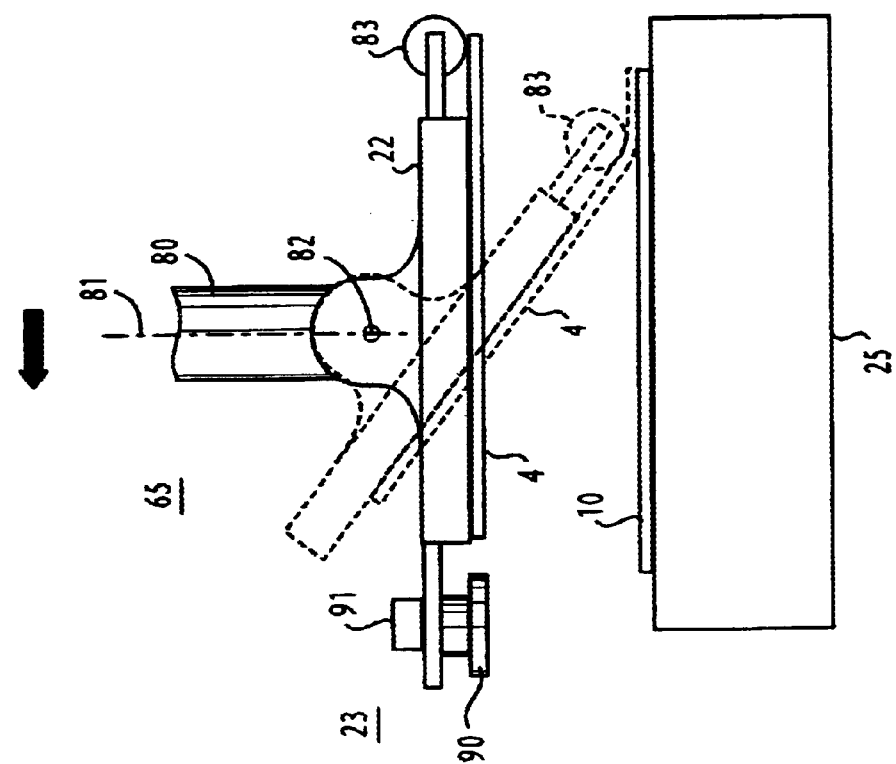
FIG. 4 is a side view of a suction plate when pasting a polarization film on an LCD panel.

Referring briefly to FIGS. 2 to 4, the optical system 23 according to a first embodiment of the present invention is illustrated.

In FIG. 2, the optical system 23 is shown comprising a polarizer 90 secured to one side of the suction plate 22 and an optical sensor 91 located above the polarizer 90. Suction plate 22 horizontally and vertically moves with respect to the suction base 25 when the arm 80 is driven by the drive mechanism, not shown, so that the polarizer 90 is positioned above the LCD panel 10. Polarization film 4, whose polarization axis must be aligned with that of orientation layer 2, is attached to the bottom of the suction plate 22 so that its axis is orthogonal to that of polarizer 90. To allow adjustment for axial alignment, the suction plate is made to swivel on the vertical axis 81 of the arm 80 when the polarizer 90 is positioned above the LCD panel 10. Polarized light source 26 includes a natural light source 84 and a polarizer 85 for forming the natural light into linearly polarized light whose polarization axis is aligned with the polarization axis of one of the orientation layers which is positioned on the lower side of the LCD panel 10. Details of the optical alignment system of the first embodiment are shown in FIG. 3A.

When the polarization film 4 is in the process of axial alignment, the orientation layer 3 is on the lower side of liquid crystal layer 1 and is irradiated from below with the linearly polarized light. With the electrodes 14 and 15 being turned off, the liquid crystal layer 1 is free of electrostatic charges. Under the influence of orientation layers 2 and 3, liquid crystal molecules LC in the layer 1 are twisted and align at the opposite surfaces of the layer 1 with the orthogonal axes (3) and (2) of the orientation layers 3 and 2. The polarized light from source 26, having the same polarization axis (3) of the orientation layer 3, is incident on the liquid crystal layer 1. The incident light undergoes a 90-degree rotation of its axis as it travels across the liquid crystal layer 1 and emanates from the orientation layer 2 with an axis oriented in the same axis (2) of orientation layer 2. The light from the LCD panel 10 is passed trough the polarizer 90 and impinges on the optical sensor 91. The amount of light incident on the optical sensor 91 is monitored and adjusted by turning the plate 22 on the vertical axis 81. Since the polarizer 90 has its axis oriented in a direction orthogonal to that of polarization film 4, a minimum amount of rays will be incident on the optical sensor 91 when the axis of polarization film 4 is aligned with the axis of orientation layer 2. The orthogonal orientation permits observers to perform black luminance measurement, rather than white luminance measurement. Since axial alignment occurs when the observed light is at a minimum level, the black luminance measurement allows a higher degree of precision than the white luminance measurement. If white luminance measurement is preferred for some reasons, the polarization film 4 has its axis aligned with that of the polarizer 90.

When the optical alignment process is complete, a pasting process is provided for pasting the polarization film 4 to the LCD panel 10. For this purpose, a roller 83 is attached to the opposite side of the plate 22 and the latter is mounted on a horizontal axle 82 of the arm 80 so that the surface of polarization film 4 can be tilted with respect to the surface of the LCD panel 10 and one edge of the former is in contact with a corresponding edge of the latter, as shown in FIG. 4. In this position, the roller 83 is brought into pressure contact with the polarization film 4. Suction plate 22 is then moved to slide over the suction base 25. As the suction plate 22 is moved, the polarization film 4 is slidably moved downwards against the air-sucking holes (not shown) provided on the bottom of plate 22 and pressed into contact with to the LCD panel 10. Since the lower surface of polarization film 4 is applied with an adhesive layer, the contact portion of the film 4 is cemented to the LCD panel 10.

Returning to FIG. 1, the LCD panel 10 with the polarization film 4 being cemented is mounted on a reversing suction plate 27 which is hinged at one end on a horizontal pivot axle. The pivot axle of the reversing suction plate 27 is driven by a motor, not shown, whereby the LCD panel is turned upside down and set on a suction base 32 of the fourth work station 64. Polarization film 4 is now positioned on the lower side of LCD panel 10. LCD panel 10 is held in position using three vertically movable edge guides 73 and the air suction system, not shown.

In a manner similar to that described above, a polarization film 5 is positioned on a suction base 2 at the third work station 63 using movable upright guides 72 which are then lowered below the surface of the suction base 28 when the film 5 is properly held in position. Polarization film 5 is coated with a transparent adhesive layer 51 covered with a separable sheet 52. When the polarization film 5 is held on the surface of the base 28, the separable sheet 52 is facing downwards.

At the third work station 63, a film carrier 68 is provided above the suction base 28. Carrier 68 includes a suction plate 29 which is supported by a movable arm 86 connected to a drive system, not shown, so that the suction plate 29 is vertically movable between high and low positions and horizontally slidable between the third and fourth stations 63 and 64. When the carrier 68 is in the lower position, the suction air that is holding the film 5 on the base 28 is stopped and the suction plate 29 starts sucking air upwards so that the film 5 is removed from the base 28 and attached to the bottom of the plate 29. Polarization film 5, whose polarization axis must be aligned with that of orientation layer 3, is secured to the suction plate 29 with its axis oriented in a direction orthogonal to that of the polarizer 90 of optical system 30.

Carrier 68 is then raised to the higher position and is started moving towards the fourth station 64. Before reaching the fourth station, the carrier 68 encounters a sheet remover 69 where the separable sheet 52 of the polarization film is brought into contact with a pressure roller 31 of adhesive tape which is rotating about its horizontal axis. While rotating about its axis, the pressure roller 31 slides from one edge of the polarization film 5 to the other in a direction normal to the direction of its rotation. As a result, an adhesive layer is applied to the lower side of separable sheet 52. At the end of the travel, the pressure roller 31 stops and then moves backwards while rotating about its axis so that the separable sheet 52 is peeled off the polarization film 5, exposing the sticking layer 51 to the outside.

Then the carrier 68 moves to a position above the suction base 32 of the fourth station 64. An optical system 30, identical to the optical system 23, is mounted on the suction plate 29 to begin an optical alignment process to align the axis of polarization film 5 with that of orientation layer 3 which is now positioned on the upper side of liquid crystal layer 1. A light source 33 is mounted on the suction base 32 to direct natural light to the polarization film 4 which is now positioned on the lower side of liquid crystal layer 1. As shown in detail in FIG. 3B, the natural light is converted to polarized light as it passes through the polarization film 4. This polarized light is aligned with the polarization axis (4) of the film 4 as it impinges on the orientation layer 2.

When the polarization film 5 is subjected to the optical alignment process, the orientation layer 2 is on the lower side of liquid crystal layer 1 and is irradiated from below with the light polarized by polarization film 4 cemented to the lower side of LCD panel 10. The polarized light from the polarization film 4, having the same polarization axis (2) of the orientation layer 2, is incident on the liquid crystal layer 1 and undergoes a 90-degree rotation of its axis as it travels across the liquid crystal layer 1 and emanates from the orientation layer 3 with an axis aligned with the same axis (3) of orientation layer 3.

The light from the orientation layer 3 is passed through the polarizer 90 of the optical system 30 and impinges on the optical sensor 91. The amount of light incident on the optical sensor 91 is monitored and adjusted by turning the suction plate 29 on the vertical axis 81 in the same manner as described in connection with the polarization film 4. Since the polarizer 90 of the optical system 30 is orthogonal to the polarization film 5, a minimum amount of rays is incident on the optical sensor 91 when the axis of polarization film 5 is aligned with the axis of orientation layer 3.

Optical system 30 may also include the optional polarizer 92 located above the first polarizer 90 to provide black luminance measurement, rather than white luminance measurement. A pasting process follows to paste the polarization film 5 to the LCD panel 10 in a manner identical to that described with reference to FIG. 4.

In the first embodiment, the polarization films 4 and 5 are orthogonal to the polarizer 90 of the optical systems 23 and 30. Since polarizer 90 is mounted on a machine and hence its polarization axis is fixed and precisely determined, misalignment between the polarization film 4 (or 5) and the polarizer 90 is smaller than misalignment which usually occurs between polarization films and orientation layers. However, the misalignment between the polarization film 4 (or 5) and the polarizer 90 can be eliminated by passing polarized light through the polarization films 4 and 5.

Figure 6A:
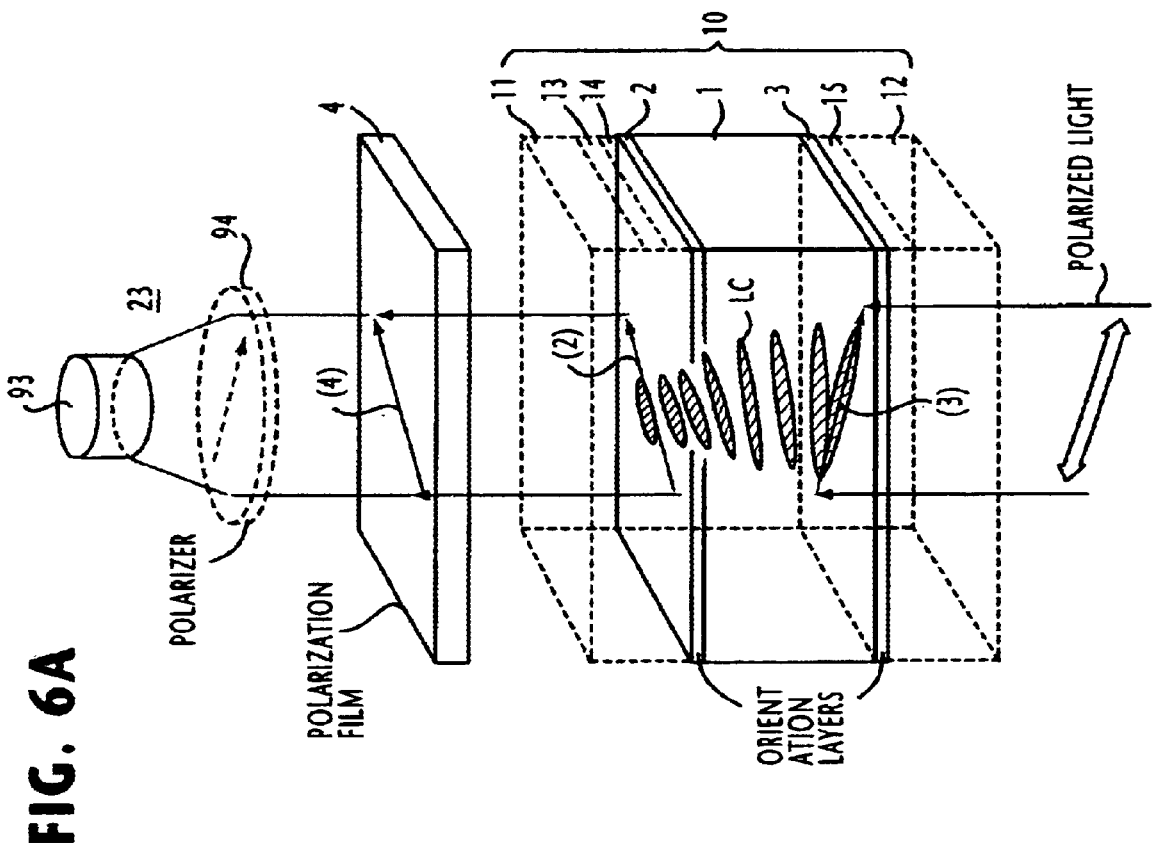
FIG. 6A is an enlarged perspective view of a portion of an LCD panel and a first polarization film of the second embodiment through which polarized light is directed.
Figure 6B:
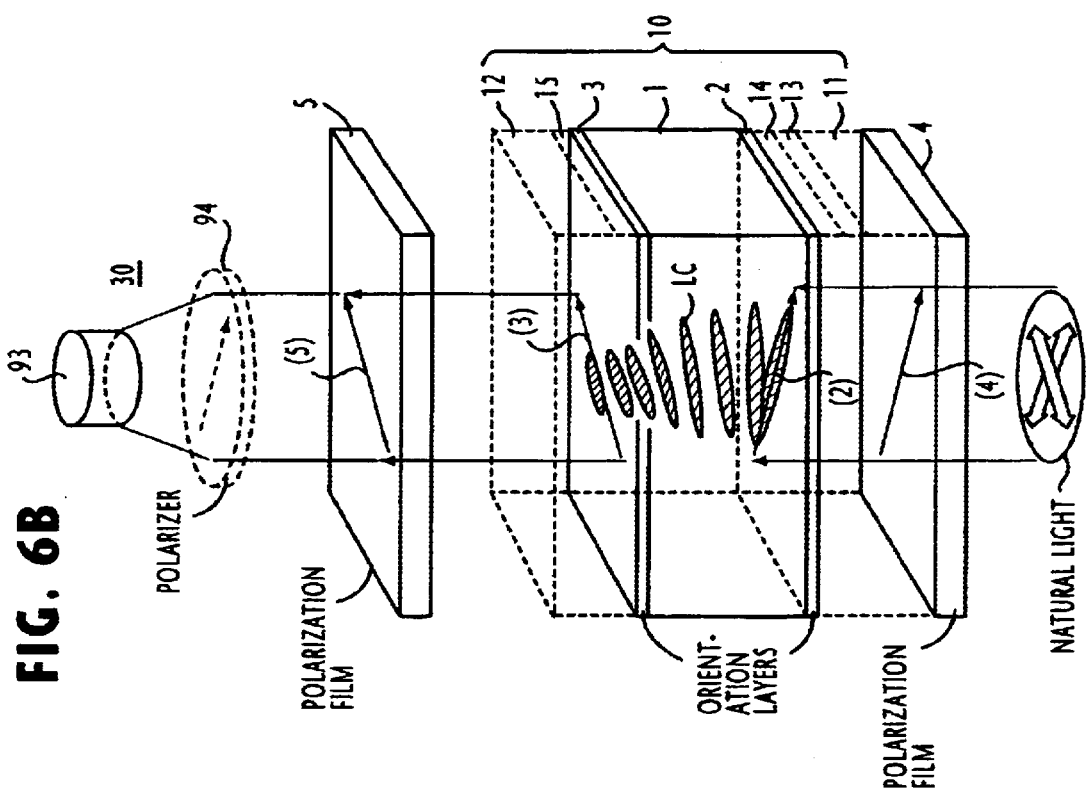
FIG. 6B is an enlarged perspective view of a portion of the LCD panel and a second polarization film of the second embodiment through which polarized light is directed.

As illustrated in FIG. 5, the optical system 23 (30) includes an optical sensor 93 which is mounted on the suction plate 22 (29) above the polarization film 4 (5) and the light from source 26 (33) is passed through the film 4 to th optical sensor 93. Misalignment between the polarization film 4 (or 5) and the orientation layer 2 (or 3) is eliminated when a maximum light level is obtained at the optical sensor 93 by swiveling the suction plate 22 (or 29) as seen from FIG. 6A (FIG. 6B). Preferably, a polarizer 94, whose axis is orthogonal to that of the polarization films 4 and 5, may be provided below the optical sensor 93 to provide black luminance measurement.

Figure 7:
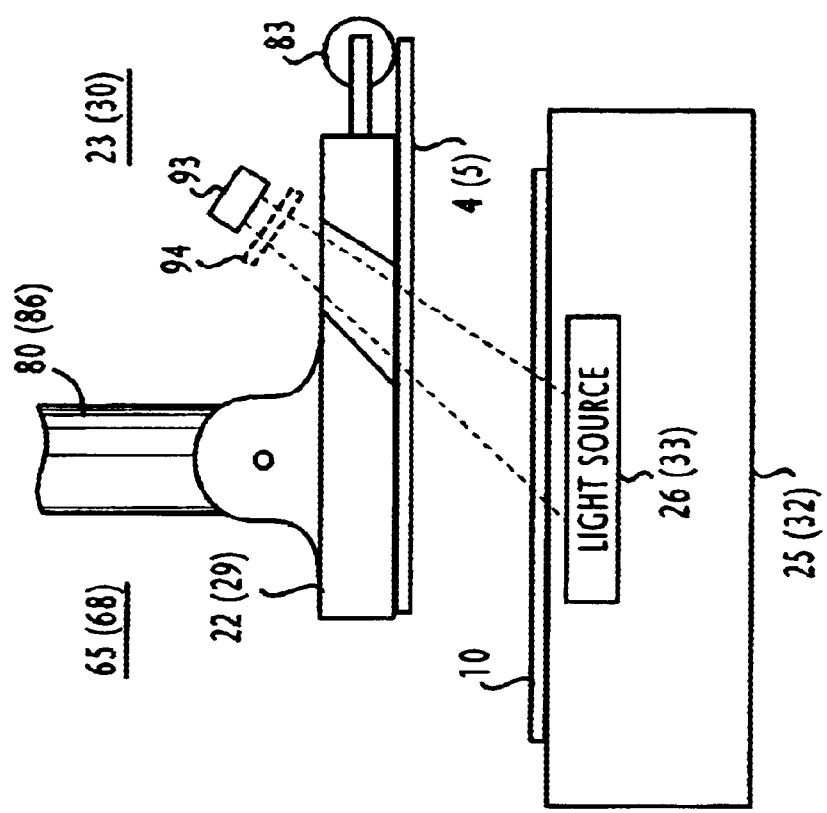
FIG. 7 is a side view of a suction plate on which an optical system of a third embodiment of the present invention is mounted for sensing polarized light directed through an LCD panel and a polarization film.

The amount of variation that occurs in the output voltage of optical sensor 93 as the suction plate is turned on its vertical axis can be increased to advantage for precision measurement. This is achieved by a modification of the arrangement of FIG. 5 as shown in FIG. 7. In this modification, the optical sensor 93 is arranged to receive polarized light whose optical path traverses the LCD panel 10 and the polarization film 4 or 5 at a skewed angle relative to their surfaces.

In order too enlarge the viewing angle of an LCD panel, a film known as optical compensation film is sandwiched between a polarization film and a orientation layer on each side of a liquid crystal layer. The optical compensation film is an anisotropic liquid crystal layer of predetermined thickness in which molecules are arranged in a hybrid orientation. The use of optical compensation films prevents leakage of light from excited (turned-on) pixels which is seen at a skewed viewing angle. In contrast with twisted nematic LCD panels whose anisotropy is positive (i.e., molecules are elongated in z-axis direction), the optical compensation film has a negative anisotropic characteristics (i.e., molecules are elongated on the x-y plane). Combined use of a twisted nematic LCD panel and an optical compensation film results in a display having an isotropic refractive characteristic, enabling it to be seen at equal optical levels in a wide range of viewing angles.

However, angular misalignment can occur between the polarization film and the optical compensation film. While the angular misalignment between the polarization film and the orientation layer can be eliminated as described above, the misalignment between the anisotropic axis of the optical compensation film and the axis of the orientation layer cannot be minimized by the use of the previous embodiments.

The embodiment shown in FIG. 8 overcomes this shortcoming. The optical system 23 of this embodiment is basically similar in configuration to that shown in FIG. 7. However, the optical system 23 of this embodiment has a polarizer 101 whose axis is aligned with that of the polarizer 85 of light source 26. Optical compensation films are pasted to the LCD panel using the system of FIG. 1 prior to the pasting of polarization films. In FIG. 8, an optical compensation film 6 is shown as a pasting step prior to the pasting of a polarization film 4. FIG. 8 shows that the optical compensation film 6 was secured to the bottom of the suction plate 22 at the first work station 61 and then carried to the second work station 62, where an LCD panel 10 has been held in place. At the second work station, the optical compensation film 6 is irradiated at a skewed angle with polarized light that has been subjected to a 90-degree rotation as it traversed through the LCD panel 10.

Figure 9A:
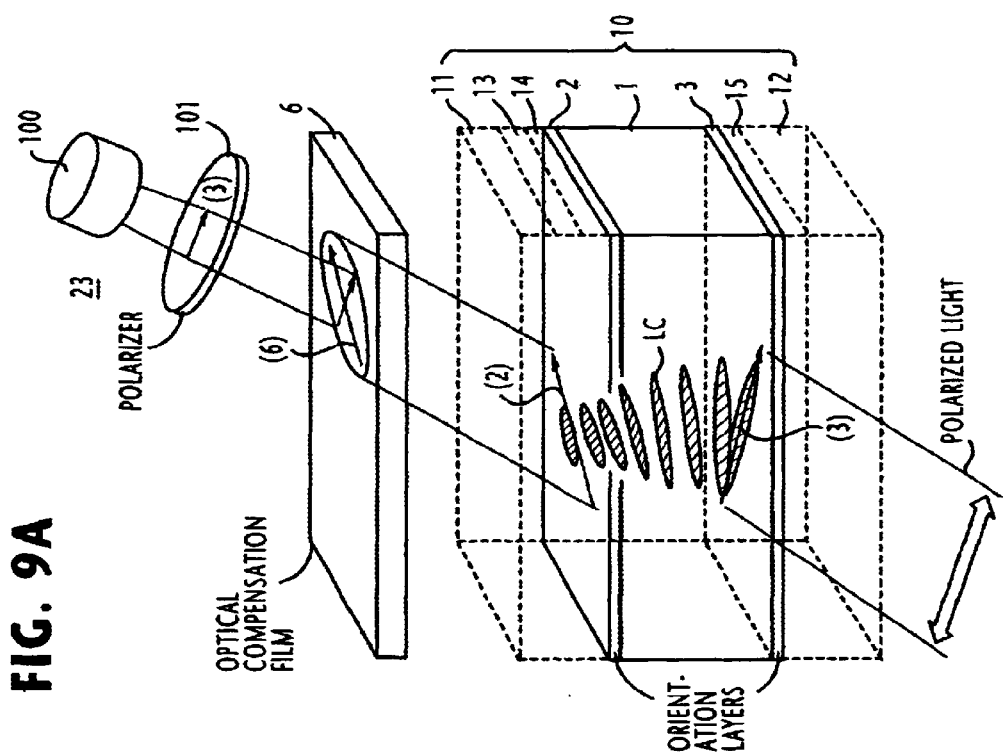
FIG. 9A is an enlarged perspective view of a portion of an LCD panel and a first optical compensation film of the fourth embodiment.

Details of the optical arrangement for axial alignment of optical compensation film 6 at the second work station are shown in FIG. 9A. The light incident on the optical compensation film 6 is one that is linearly polarized as it exits the orientation layer 2. As the light traverses the optical compensation film 6 at a skewed angle, it undergoes a change from linear polarization to elliptical polarization. Since the elliptically polarized light contains a linear component in the direction of axis (3) of orientation layer 3. This linear component, which would otherwise be seen as leakage light when viewed at an angle, is selected by the polarizer 101 and detected by an optical sensor 100. Misalignment, which may exist between the anisotropic axis (6) of optical compensation film 6 and the polarization axis (2) of orientation layer 2, is minimized by turning the suction plate 22 when the black luminance measurement of optical sensor 100 produces a minimum value. When this occurs, the viewing angle of the LCD panel 10 expands in the direction of polarization axis (3).

Optical compensation film 6 is then pasted on the LCD panel 10 in the same way as the polarization film 4 was pasted by using the arrangement of FIG. 4.

Figure 9B:
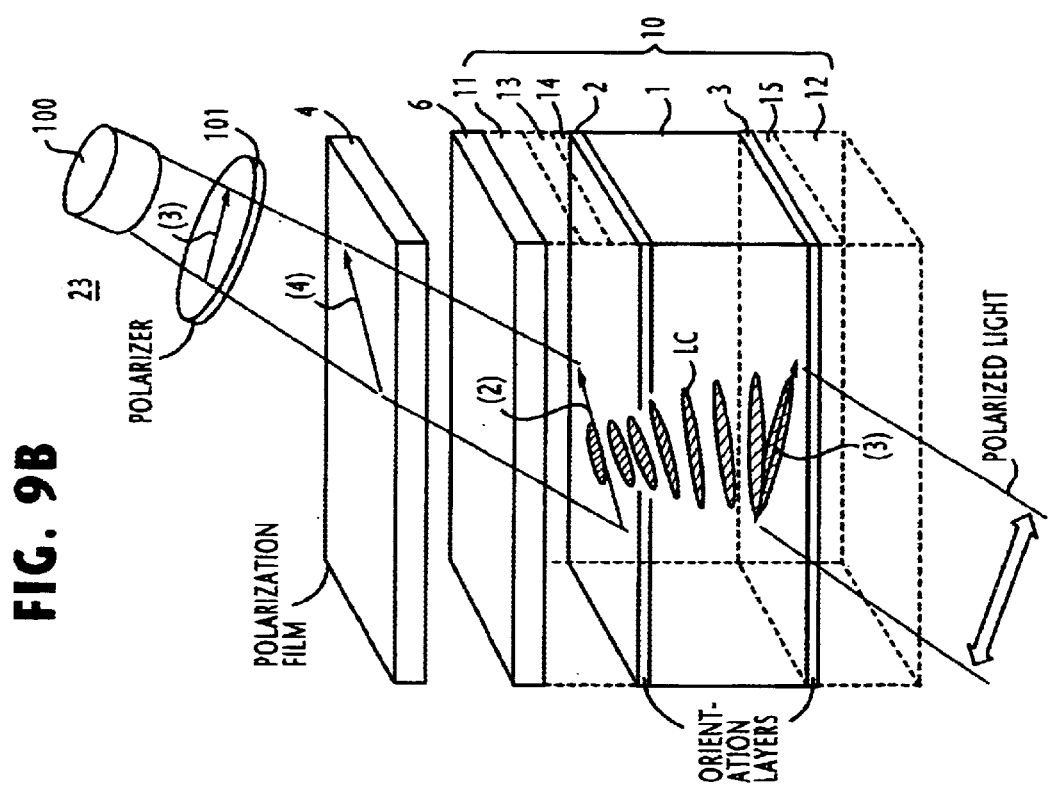
FIG. 9B is an enlarged perspective view of a portion of the LCD panel and a first polarization film of the fourth embodiment.

With the optical compensation film 6 being pasted on the LCD panel 10 as shown in FIG. 9B, the axis (3) of polarizer 101 is orthogonal to the axis (4) of polarization film 4. Therefore, a minimum value is obtained for black luminance measurement at the output of optical sensor 100 when the polarization film 4 is aligned with the orientation layer 2. Polarization film 4 is then pasted on the optical compensation film 6 and then turned upside down by the reversing suction plate 27 and placed on the suction base 32 at the fourth work station 64.

Processes similar to those described with reference to FIGS. 9A and 9B are repeated on an optical compensation film 7 and a polarization film 5.

Figure 9C:
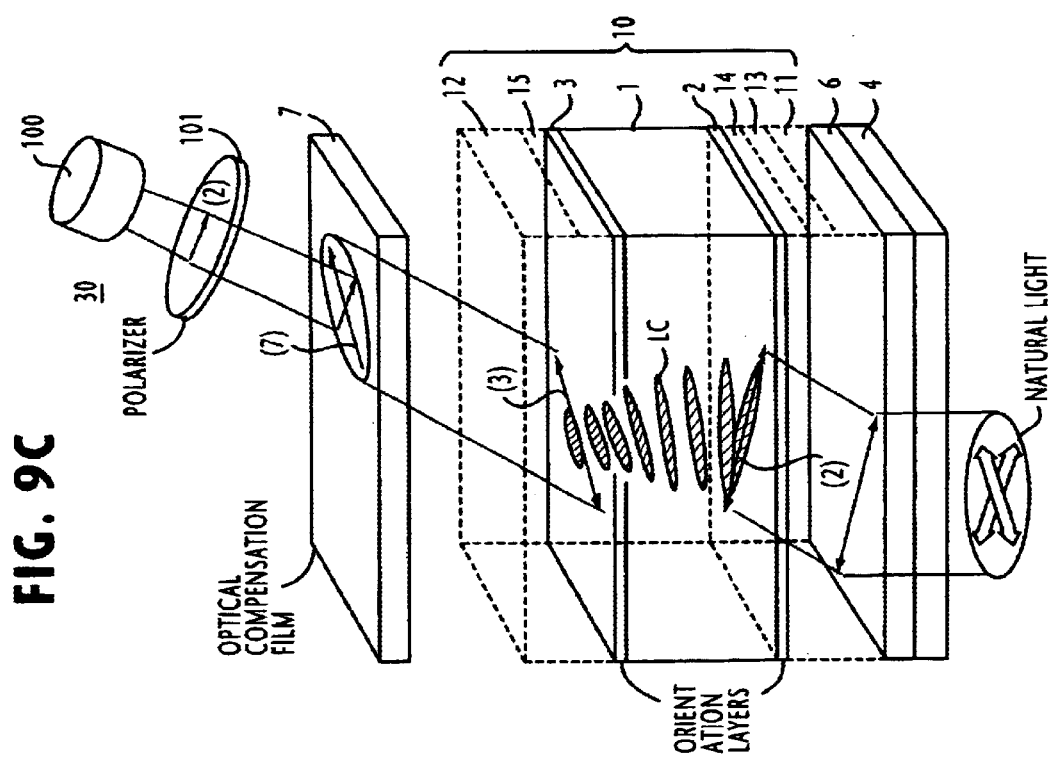
FIG. 9C is an enlarged perspective view of a portion of the LCD panel and a second optical compensation film of the fourth embodiment.

FIG. 9C shows that the optical compensation film 7 is first placed on the suction base of third station 63 and carried by the carrier 68 to the fourth station 64. Polarizer 101 of the optical system 40 is aligned with the axis (2) of the orientation layer 2. Misalignment, which may exist between the anisotropic axis (7) of optical compensation film 7 and the polarization axis (3) of orientation layer 3, is minimized by turning the suction plate 29 of the carrier 68 when the black luminance measurement of optical sensor 100 produces a minimum value. When this occurs, the viewing angle of the LCD panel 10 expands in the direction of polarization axis (2). Optical compensation film 7 is then pasted on the LCD panel 10.

With the optical compensation film 7 being pasted on the LCD panel 10 as shown in FIG. 9D, the axis (3) of polarizer 101 is orthogonal to the axis (5) of polarization film 5. A minimum value is thus obtained for black luminance measurement at the output of optical sensor 100 when the polarization film 5 is aligned with the orientation layer 3. Polarization film 5 is then pasted on the optical compensation film 7.

Note that in FIGS. 9B and 9D, the polarizer 101 may be dispensed with if white luminance measurement is used for detecting misalignment.

What is claimed is:

1. A method of fabricating a liquid crystal display, comprising the steps of:
   a) setting a liquid crystal display panel on a fixed base, said panel including a liquid crystal layer and an orientation layer on one surface of said liquid crystal layer;
   b) setting a first anisotropic film relative to said orientation layer;
   c) directing linearly polarized light to said panel and said anisotropic film and detecting light therefrom; and
   d) adjusting angle of orientation of said anisotropic film relative to said orientation layer according to intensity of the detected light.

2. The method of claim 1, wherein the step (b) further comprises setting a second anisotropic film and the first anisotropic film relative to said orientation layer, and wherein said second anisotropic film has a polarization axis aligned with polarization axis of the first anisotropic film.

3. The method of claim 2, wherein the polarization axis of said first anisotropic film is orthogonal to polarization axis of said orientation layer.

4. The method of claim 1, wherein the step (b) further comprises setting a second anisotropic film parallel to the first anisotropic film, whereby said linearly polarized light passes through the first and second anisotropic films, said second anisotropic film having a polarization axis orthogonal to polarization axis of the first anisotropic film.

5. The method of claim 1, further comprising pasting said first anisotropic film on said orientation layer after the step (c) is performed.

6. The method of claim 1, wherein the step (c) comprises directing said linearly polarized light in a direction perpendicular to said panel.

7. The method of claim 1, wherein the step (c) comprises directing said linearly polarized light at a skewed angle to said panel.

8. A method of fabricating a liquid crystal display, comprising the steps of:
   setting a liquid crystal display panel on a fixed base, said panel including a liquid crystal layer and an orientation layer on one surface of said liquid crystal layer;
   setting an optical compensation film and a polarizer relative to said orientation layer;
   directing linearly polarized light to said panel, said optical compensation film and said polarizer at a skewed angle and detecting light therefrom, said linearly polarized light having a polarization axis aligned with polarization axis of said polarizer; and
   adjusting angle of orientation of said optical compensation film relative to said orientation layer according to intensity of the detected light.

9. The method of claim 8, further comprising pasting said optical compensation film on said orientation layer after the adjusting step is performed.

10. The method of claim 9, further comprising the steps of:
    setting a polarization film relative to said orientation layer;
    directing linearly polarized light to said panel, said optical compensation film, and said polarization film at said skewed angle and detecting light therefrom; and
    adjusting angle of orientation of said polarization film relative to said orientation layer according to intensity of the detected light.

11. The method of claim 10, further comprising pasting said polarization film on said optical compensation film after the adjusting step is performed.

12. The method of claim 9, further comprising the steps of:
    setting a polarization film and said polarizer relative to said orientation layer;
    directing linearly polarized not to said panel, said optical compensation film, said polarization film and said polarizer at said skewed angle and detecting light therefrom, said linearly polarized light having a polarization axis aligned with polarization axis of said polarizer; and
    adjusting angle of orientation of said polarization film relative to said orientation layer according to intensity of the detected light.

13. The method of claim 12, further comprising pasting said polarization film on said optical compensation film after the adjusting step is performed.

14. A system for fabricating a liquid crystal display, comprising:
    base means for setting a liquid crystal display panel, said panel including a liquid crystal layer and an orientation layer on one surface of said liquid crystal layer;
    carrier means for setting a first anisotropic film relative to said orientation layer;
    a light source for directing linearly polarized light to said panel and said anisotropic film; and
    an optical sensor for detecting the directed light from said anisotropic film,
    said carrier means being rotatable so that angle of orientation of said anisotropic film can be adjusted relative to said orientation layer according to intensity of the detected light.

15. The system of claim 14, wherein said carrier means includes means for setting a second anisotropic film and the first anisotropic film relative to said orientation layer, and wherein said second anisotropic film has a polarization axis aligned with polarization axis of the first anisotropic film.

16. The system of claim 15, wherein the polarization axis of said first anisotropic film is orthogonal to polarization axis of said orientation layer.

17. The system of claim 14, wherein the carrier means further comprises means for setting a second anisotropic film parallel to the first anisotropic film, whereby said linearly polarized light passes through the first and second anisotropic films, said second anisotropic film having a polarization axis orthogonal to polarization axis of the first anisotropic film.

18. The system of claim 14, wherein said carrier means includes means for pasting said anisotropic film on said orientation layer.

19. The system of claim 14, wherein the light source is arranged to direct said linearly polarized light in a direction perpendicular to said liquid crystal display panel.

20. The system of claim 14, wherein the light source is arranged to direct said linearly polarized light at a skewed angle to said liquid crystal display panel.

21. A system for fabricating a liquid crystal display, comprising:
    base means for setting a liquid crystal display panel, said panel including a liquid crystal layer and an orientation layer on one surface of said liquid crystal layer;

carrier means for setting an optical compensation film and a polarizer relative to said orientation layer;

a light source for directing linearly polarized light to said panel, said optical compensation film and said polarizer at a skewed angle;

an optical sensor for detecting the directed light from said polarizer, said linearly polarized light having a polarization axis aligned with polarization axis of said polarizer; and said carrier means being rotatable so that angle of orientation of said optical compensation film can be adjusted relative to said orientation layer according to intensity of the detected light.

22. The system of claim 21, wherein said carrier means includes means for pasting said optical compensation film on said orientation layer.

* * * * *

UNITED STATES PATENT AND TRADEMARK OFFICE
CERTIFICATE OF CORRECTION

| | | |
|---|---|---|
| PATENT NO. | : 6,621,551 B2 | Page 1 of 1 |
| APPLICATION NO. | : 09/892836 | |
| DATED | : September 16, 2003 | |
| INVENTOR(S) | : Tadashi Matsuzawa | |

It is certified that error appears in the above-identified patent and that said Letters Patent is hereby corrected as shown below:

TITLE PAGE,
Under REFERENCES CITED at (56):

Add the following reference:
 JP11-271778

Signed and Sealed this

Twentieth Day of September, 2011

David J. Kappos
*Director of the United States Patent and Trademark Office*